United States Patent
Morrison

(10) Patent No.: US 8,843,973 B2
(45) Date of Patent: Sep. 23, 2014

(54) SYSTEM AND METHOD FOR ORDERING AND DISTRIBUTING MULTIMEDIA CONTENT

(75) Inventor: Stephen D. Morrison, Watertown, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1159 days.

(21) Appl. No.: 11/859,634

(22) Filed: Sep. 21, 2007

(65) Prior Publication Data
US 2009/0083808 A1    Mar. 26, 2009

(51) Int. Cl.
| | |
|---|---|
| *H04N 7/173* | (2011.01) |
| *H04N 7/16* | (2011.01) |
| *H04N 21/658* | (2011.01) |
| *H04N 21/4227* | (2011.01) |
| *H04N 21/414* | (2011.01) |
| *H04N 21/4223* | (2011.01) |
| *H04N 21/472* | (2011.01) |

(52) U.S. Cl.
CPC ....... *H04N 7/17336* (2013.01); *H04N 21/6582* (2013.01); *H04N 21/4227* (2013.01); *H04N 21/41407* (2013.01); *H04N 21/4223* (2013.01); *H04N 21/47202* (2013.01)
USPC .................................. 725/87; 725/8; 725/104

(58) Field of Classification Search
None
See application file for complete search history.

(56) References Cited

U.S. PATENT DOCUMENTS

| 7,383,209 | B2 * | 6/2008 | Hudetz et al. .................... 705/26 |
|---|---|---|---|
| 7,593,326 | B2 * | 9/2009 | Collet et al. ................... 370/229 |
| 2003/0121047 | A1 * | 6/2003 | Watson et al. ................... 725/93 |
| 2004/0002359 | A1 * | 1/2004 | Deas et al. ................. 455/556.2 |
| 2004/0058706 | A1 * | 3/2004 | Williamson et al. .......... 455/557 |
| 2006/0258397 | A1 * | 11/2006 | Kaplan et al. .............. 455/556.1 |
| 2007/0090966 | A1 * | 4/2007 | Watanabe et al. ......... 340/825.69 |
| 2008/0301750 | A1 * | 12/2008 | Silfvast et al. ................ 725/131 |
| 2008/0307469 | A1 * | 12/2008 | Swix et al. ....................... 725/93 |
| 2011/0126246 | A1 * | 5/2011 | Thomas et al. .................. 725/93 |

* cited by examiner

*Primary Examiner* — Jason K Lin

(57) ABSTRACT

A system and method for ordering and distributing multimedia content including a receiver to receive data for ordering multimedia content, a decoder to decode the data in the event the data is encoded, and distributing the multimedia content based on the data to one or more output devices at a predetermined time.

15 Claims, 4 Drawing Sheets

SYSTEM AND METHOD FOR ORDERING AND DISTRIBUTING MULTIMEDIA CONTENT

BACKGROUND INFORMATION

Televisions are becoming increasingly popular with consumers. Because of advances in recent technology, television-watching has evolved into a multimedia experience. For example, consumers may now watch television in high-definition on large flat-screens with stereo surround sound in the comfort of their homes. To add to this experience, video-on-demand systems have enabled viewers to find and enjoy various multimedia content, such as television programs, at any desired time. For example, viewers simply go through a menu of programs that have aired or are available for airing, order the program (typically for a small cost), and the program immediately begins to play on their television screen. Similarly, personal video recorders (PVRs), such as digital video recorders (DVRs), allow consumers to record programs for future viewing. Thus, both video-on-demand and video recording systems allow viewers to view television programs at their own ease and according to their own schedule. As a result, television-watching experience has become more convenient and pleasurable for viewers. However, video-on-demand and video recording systems are limited in how programs are ordered/recorded by viewers and/or distributed by network providers.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

DETAILED DESCRIPTION OF EMBODIMENTS

Exemplary embodiments may provide a system and method for ordering and distributing multimedia content. That is, exemplary embodiments may, among other things, expand the marketplace for acquiring multimedia or digital content (e.g., TV programs) and distributing such content in a manner that is efficient and optimizes network utility.

Figure 1:
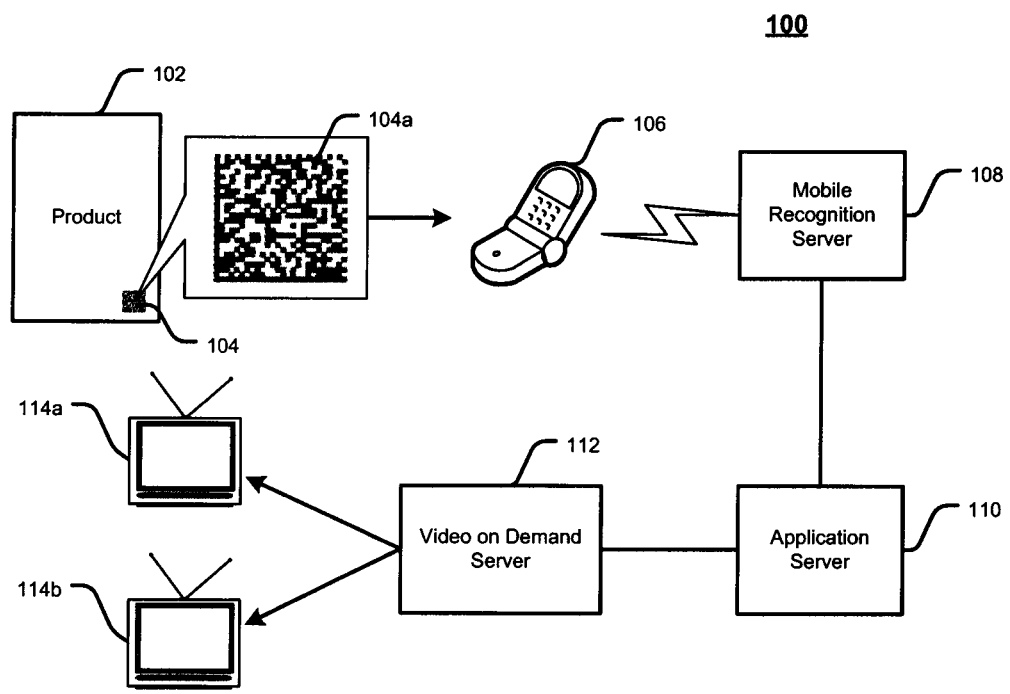
FIG. 1 depicts a block diagram of a system architecture, according to an exemplary embodiment.

FIG. 1 depicts a block diagram of a system architecture, according to an exemplary embodiment. The system 100 may be referred to as having a subscriber side and a vendor side. The subscriber side of the system 100 may include, among other things, a product 102 having encoded data 104, a user device 106, one or more set top media boxes (not shown), and one or more output devices 114a, 114b. The vendor side of the system 100 may include a mobile recognition server 108, an application server 110, and a video-on-demand server 112. Although each of the components are described as servers, it should be appreciated that these components may also include server-like components or modules. Other various network components and embodiments may also be provided.

The product 102 may be a physical item, a representation of a physical item, or a representation of an electronic item. For example, a poster of a recent movie may be hanging from a store window. In this example, the product 102 may be the actual physical poster hanging from the store window, a smaller version of the poster in the back of the store, or multimedia content (e.g., video, music, etc.) of what is depicted in the poster. In other words, the product 102 may represent a variety of items that may be ordered or purchased by consumers. Other various product items may include coupons, rebates, contests, advertisements, and other related items. Furthermore, such product items may also be found in magazines, fliers, newspapers, books, product labels or packaging (e.g., on CDs, DVDs, VHSs, etc.), websites, emails, or other related media.

The encoded data 104 on the product 102 may be any data that is readable or decoded by an electronic device (not shown). The encoded data may include a barcode, symbol, watermark 104a, or other data readable by an electronic device. In one embodiment, the encoded data 104 may be imaged by one electronic device and forwarded to another electronic device for decoding. In another embodiment, the encoded data 104 may be directly decoded without image capture at the electronic device. Other various embodiments may also be provided.

Figure 2A:
FIG. 2A-2C depicts various types of barcodes, according to an exemplary embodiment.
Figure 2B:
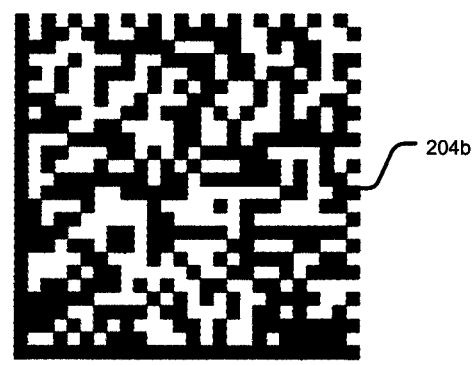
Figure 2C:

FIG. 2A-2C depicts various types of encoded data 104, according to an exemplary embodiment. In one embodiment, as depicted in FIG. 2A, the encoded data 104 may be a one-dimensional barcode 204a. For example, these may include a variety of one-dimensional barcodes, such as Code 39, Code 93, Code 128, UPC, EAN, JAN, Interleaved 2 of 5, Code 11, Codabar, MSI Plessey, RSS Family, etc. In another embodiment, as depicted in FIG. 2B, the encoded data 104 may be a two-dimensional barcode 204b, which may include, for example, PDF 417, QR Code, Data Matrix, Maxicode, MicroPDF417, Micro QR Code, Codablock, Composite, etc. In yet another embodiment, as depicted in FIG. 2C, the encoded data 104 may include a postal code 204c. For example, these may include various postal codes, such as Postnet, Planet, UPU, USPS 4CB, Australia Post, Japanese Post, Royal Mail RMaSCC, K IX Code, etc. Other various encoded data 104 may also be provided, such as symbols, digital watermarks, and other encoded data.

The user device 106 may be any communication device capable of transmitting or receiving data. In one embodiment, the user device 106 may include a telephone or a mobile communication device, such as a personal digital assistant (PDA), a mobile phone, or a smart phone. In another embodiment, the user device 106 may also include other communication devices, such as desktop computers, laptops/notebooks, gaming controllers, remote controllers, or other device capable of transmitting and/or receiving signals. It should also be appreciated by one skilled in the art that any device capable of transmitting alphanumeric commands may function as a user device for the purposes of the embodiments described. For example, a remote control device, a keyboard, or landline telephone, among other things, may function as a user device 106.

In one embodiment, the user device 104 may be equipped with an imager or camera. For example, the imager or camera may be used to capture an image of encoded data 104. In another embodiment, the user device 106 may be coupled to a detachable electronic reader (not shown) capable of "reading" or decoding encoded data 104. Other various embodiments may also be provided.

Referring back to the example of the movie poster hanging from the store window, a customer who sees the poster and desires to watch that movie at his or home later that evening may place an order for that movie or other multimedia content depicted in the poster by using his or her user device 106 by taking an image of encoded data 104 located at the bottom of the poster.

The user device 106 may connect to a network to communicate with at least one server or module (e.g., the mobile recognition server 108) in a variety of ways, such as wired or wireless connection. In one embodiment, wired broadband connection may include long-range optical data communications, local area network based protocols, wide area networks, and/or other similar applications. In another embodiment, wireless broadband connection may include long-range wireless radio, local area wireless network such as 802.11 based protocols, wireless wide area network such as WiMax, infrared, Bluetooth™, and/or other similar applications. In one embodiment, the network may include the Internet or World Wide Web. Other networks may also be utilized for connecting each of the various devices, systems and/or servers.

The mobile recognition server 108 may receive and process signals from the user device 106 via a network as described above. These signals may include one or more orders for multimedia content (e.g., the movie depicted in the poster). In one embodiment, the mobile recognition server 108 may process the signals by decoding (e.g., in the event the signals include images of encoded data 104) and interpreting the signals. In another embodiment, the mobile recognition server 108 may process the signals by persisting (or storing) the signals in a queue and/or one or more data storage systems (e.g., database) (not shown). In yet another embodiment, the mobile recognition server 108 may also communicate with the user device 106 to request instructions regarding one or more received signals. For example, upon receiving a transmission for ordering a particular movie, the mobile recognition server 108 may communicate with the user device 106 and request instructions regarding what time to send the order to other downstream servers (e.g., the application server 110) for further processing and order completion. In the event no instructions are received, the mobile recognition server 108 may utilize its own processing logic and/or information retrieved from one or more databases to determine the best solution (e.g., time to further process the order) to resolve the issue. As such, the mobile recognition server 108 may also include a workflow engine, in addition to the processing and data storage capabilities, to implement and execute the orders or signals received from one or more user devices in an efficient and expedient manner. Other various embodiments may also be provided.

The application server 110 may receive one or more signals from the mobile recognition server 108. Similar to the mobile recognition server 108, the application server 110 may include processing logic in at least one server or module, one or more databases, and a workflow engine to keep track of various communications. The application server 110 may store, in one or more data storage systems, various multimedia content for distribution. In one embodiment, the application server 110 may be programmed to track multimedia orders for processing and distributing them, e.g., in a timely and efficient manner, to customers. In another embodiment, the application server 110 may also be programmed with processing logic having rules and assumptions to determine and calculate the probability a customer will be able to receive his or her order. For example, a customer may order a movie to be watched at home. However, the user device from which the customer ordered the movie may be determined to be approximately 50 miles away from the customer's home. This may be accomplished via a global positioning system (GPS), GPS-like device, or other location detection device (e.g., based on signal transmission). In this instance, the application server 110 that receives the decoded order from the mobile recognition server 108 may determine that the earliest the customer will be able to view the ordered movie will be an hour later (based on distance, travel, etc.). As a result, the application server 110 may process other more urgent orders/requests before this one. Accordingly, the application server 110 may coordinate with other network components and available resources to provide load balancing and optimize network utilization without sacrificing customer service.

The video-on-demand server 112 may receive distribution orders from the application server 110 and dispatch orders to various customers/viewers. In one embodiment, similar to the mobile recognition server 108 and the application server 110, the video-on-demand server 112 may also include processing logic in at least one server or module, database capability, and workflow management to stream orders to customers. For example, the video-on-demand server 112 may coordinate with the application server 110 to deliver ordered movies to customers in an efficient and expedient manner. As discussed in the previous example, after determining the amount of time the application server 110 has to deliver the multimedia content, the application server 110 may process other more urgent orders. In another embodiment, the application server 110 may also wait for additional orders (e.g., from the mobile recognition server 108 or the video-on-demand server 112) for the same multimedia content within the same delivery area. For example, in the event that two or more customers, who live in the same delivery area (e.g., two houses away), order the same movie to be watch in the same evening, the video-on-demand server 112 may queue the ordered movie from the application server 110 and deliver the ordered movie via a multicast stream to both customers. Not only does this provide an efficient way for delivering multimedia content, it also improves use of network resources, lowers cost of distribution, and increases speed of delivery.

In another embodiment, for example, in the event that customers may have recording systems (e.g., PVRs or DVRs) connected to their set top boxes, the video-on-demand server 112 may stream the ordered multimedia ahead of time to be stored at the recording systems for future viewing. This may be useful for providing flexibility in servicing customers, especially in regards to determining and planning network resource availability. Each of the mobile recognition server 108, the application server 110, and the video-on-demand server 112 may also utilize the features and functions of the customer's recording system to determine the optimum time to stream the ordered multimedia content to maximize network utility. In addition, in the event that customers want to view an ordered movie before it is available at a customer's home, the video-on-demand server 112 may provide a unicast video demand stream to meet the customer's need. In this example, the previously planned multicast queue may be cancelled. Thus, the video-on-demand server 112 may create a fluid environment for which customers may reliably receive their orders/requests. Other various embodiments may also be provided.

Customers may receive their orders at one or more output devices 114a, 114b. These may be televisions, monitors, set top boxes, recording systems, computers, gaming consoles, digital picture frames, mobile multimedia devices (e.g., mp3 players or portable televisions), and other device capable of outputting media signals.

It should be appreciated by one of ordinary skill that various servers and components described above may be connected to each other via one or more networks. It should also be appreciated that not all components of the system 100 may be illustrated in FIG. 1. Other variations and components may also be provided, such as a customer habit server (e.g., from which personal habit information of customers may be fetched and used to help determine optimal delivery time), user interfaces for the servers, other network components, or additional inputs/outputs, etc.

Although each of the mobile recognition server 108, the application server 110, and the video-on-demand server 112 is depicted as one server, it should be appreciated that the contents of the each of these servers may be combined into fewer or greater numbers of servers (or server-like devices, such as modules) and may be connected to one or more processors and/or data storage systems. Furthermore, each of these servers may be local, remote, or a combination thereof to each other.

In addition, it should be appreciated that while a telephone line is not depicted in any of the figures, one of ordinary skill in the art would recognize that telephone lines may be utilized for transmitting data and/or information between the various components of system 100. For example, a viewer who desires to pay to watch a particular show/movie may transmit his or her selection to a network provider via a telephone line. Here, the network provider may transmit the selected programming via satellite or other similar transmission, such as cable, FiOS, or other wired or wireless connections.

One or more data storage systems (e.g., databases) (not shown) may also be coupled to each of the devices or servers of the system 100. In one embodiment, the one or more data storage systems may store relevant information for each of the servers 108, 110, 112. Exemplary database information may include order request, order number, order sequence, network provider information, multimedia name/code, multimedia channel numbers, multimedia channel names, multimedia listings/categories, program schedules, multimedia availability, future and past programming information, ratings, viewer preferences, advertisement categories, advertisers, advertised products/services, and/or other information provided by a viewer, network provider, storage source (e.g., pre-recorded TV programs/movies), or other third party source.

It should be appreciated that the contents of any of these one or more data storage systems may be combined into fewer or greater numbers of data storage systems and may be stored on one or more data storage systems and/or servers. Furthermore, the data storage systems may be local, remote, or a combination thereof. In another embodiment, information stored in the databases may be useful in providing additional customizations for enhanced multimedia or TV-viewing experience.

Additionally, one or more processors (not shown) may also be coupled to each of the servers 108, 110, 112 and/or the one or more data storage systems. It should be appreciated that the one or more processors may be used for processing, calculating, and organizing data and/or information. In another embodiment, for example, the one or more processors may be used for all logic processing, as described above, for product delivery, network resource planning, etc.

Embodiments of ordering and distributing multimedia content may expand the limited number of techniques for purchasing and delivering multimedia content. By capturing an image of encoded data 104 of a product 102, for example, a customer/subscriber may order multimedia content from the convenience of his or her user device 106. By receiving and decoding the data from the user device 106, the vendor side servers 108, 110, 112 may process the order and deliver the order in a manner that optimizes network resources. As a result, the overall television-watching experience may be further enhanced because viewers may spend less time navigating programs/shows and spend more time enjoying their preferred programs/shows at their convenience.

Figure 3:
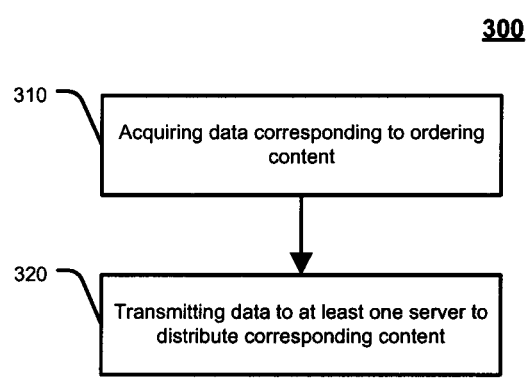
FIG. 3 depicts a flowchart of a method for ordering multimedia content for distribution, according to an exemplary embodiment.

FIG. 3 depicts a flowchart of a method for ordering and distributing video content 300, according to an exemplary embodiment. The exemplary method 300 is provided by way of example, as there are a variety of ways to carry out methods disclosed herein. The method 300 shown in FIG. 3 may be executed or otherwise performed by one or a combination of various systems. The method 300 is described below as carried out by the system 100 shown in FIG. 1 by way of example, and various elements of the system 100 are referenced in explaining the example method of FIG. 3. Each block shown in FIG. 3 represents one or more processes, methods, or subroutines carried in the exemplary method 300. A computer readable media comprising code to perform the acts of the method 300 may also be provided. Referring to FIG. 3, the exemplary method 300 may begin at block 310.

At block 310, data relating to an order for multimedia content may be acquired. For example, a user device 106 may acquire data (e.g., an image of encoded data 104 for a product 102) that relates to an order for multimedia content. As discussed with reference to FIG. 1, the image may include one of at least a barcode, a watermark, postal code, or other encoded data, and the user device 106 may include at least one of a mobile phone, an imaging device, a personal digital assistant, a gaming device, a computer, or other similar device. For example, in one embodiment, a customer may use his or her user device 106 to capture an image of encoded data 104 on a product of interest 102.

Alternatively, in another embodiment, rather than taking an image of the encoded data 104, the user device 106 may be coupled to an electronic reader or decoder that may scan the encoded data 104 of the product of interest. In yet another embodiment, the user device 106 may capture an image of the encoded data 104 and read or decode the encoded data 104 at the user device 106 using processing logic or other similar processing techniques. Thus, the reader or decoder may be a detachable image scanner, have processing logic used with data storage components, or provide other reading/decoding functions. As a result, the user device 106 may acquire data that relates to an order for multimedia content in the form of an image or in the form decoded data.

In another embodiment, the data relating to ordering multimedia content may also be based on a manual entry. For example, rather than capturing an image of encoded data 104 or reading/decoding encoded data 104 from a product 102, a manual entry may be entered into a user device 106 specifying the desired product, e.g., by alphanumeric entry, menu selection, or other similar entry. In this example, a customer may specify that he or she wants multimedia content to be delivered at a particular time and/or location.

At block 320, the acquired data may be transmitted to at least one server. For example, the user device 106 may transmit the acquired data (e.g., image, photo, decoded data, manual entry, etc.) to at least one server for distributing the multimedia content to one or more output devices at a predetermined time. Transmitting the acquired data to at least one server may include transmitting data in a variety of ways, such as via wired or wireless connection as discussed above with reference to FIG. 1.

Figure 4:
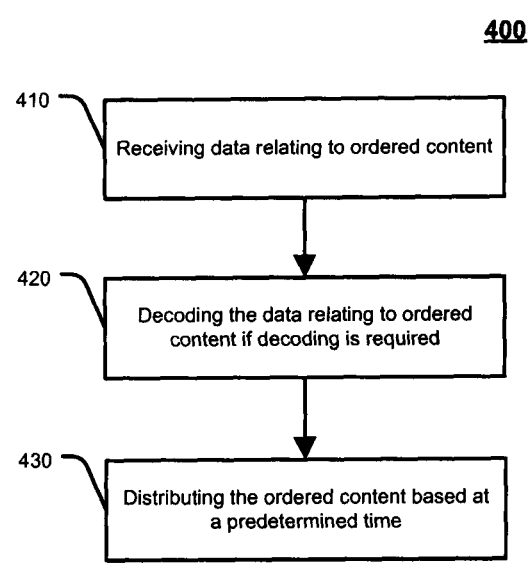
FIG. 4 depicts a flowchart of a method for distributing ordered multimedia content, according to an exemplary embodiment.

FIG. 4 depicts a flowchart of a method for ordering and distributing video content 400, according to an exemplary embodiment. The exemplary method 400 is provided by way of example, as there are a variety of ways to carry out methods disclosed herein. The method 400 shown in FIG. 4 may be executed or otherwise performed by a combination of various systems. The method 400 is described below as carried out by the system 100 shown in FIG. 1 by way of example, and various elements of the system 100 are referenced in explaining the example method of FIG. 4. Each block shown in FIG. 4 represents one or more processes, methods, or subroutines carried in the exemplary method 400. A computer readable media comprising code to perform the acts of the method 400 may also be provided. Referring to FIG. 4, the exemplary method 400 may begin at block 410.

At block 410, data for ordered multimedia content may be received. For example, a receiver, situated at the mobile recognition server 108, may receive data from a user device 106 that relates to an order for multimedia content. In the event that the received data has already been decoded by the user device 106, the data may be directly forwarded, by the mobile recognition server 108, for processing at the application server 110 without decoding the data.

At block 420, data received may be decoded in the event decoding data is required. For example, a decoder, at the at least one server (e.g., the mobile recognition server 108), may decode the data. Thus, in the event a user device 106 transmits data in the form of an image that has not yet been read or decoded, the mobile recognition server 108 may include processing logic and/or data storage components for reading and/or decoding the encoded data 104 relating to multimedia content. In this example, the decoder may include an image scanner, processing logic and/or data storage, or other reading/decoding means. The image may include a barcode, a watermark, postal code, or other similar encoded data. Once the mobile recognition server 108 decodes the encoded data 104, the mobile recognition server 108 may transmit this information to the application server 110 for further processing.

At block 430, multimedia content corresponding to the received data may be distributed. For example, the application server 110 may then deliver the corresponding ordered multimedia content to the customer or the customer's output device 114 at a predetermined time. A transmitter, at the at least one server (e.g., the application server 110), may distribute the multimedia content based on the data received from the mobile recognition server 106. In one embodiment, the multimedia content may include at least one of a movie, a movie trailer, a television episode, a television series, a commercial or advertisement, a music video, a music file, a digital image, a video game, a website, a hyperlink, an email, or other multimedia content.

As discussed above with reference to FIG. 1, the predetermined time for delivery of the multimedia content may be determined from at least one of a time when the image is acquired, a location where the image is acquired, network capacity, network cost, network efficiency, customer habit, customer equipment, and a manual time entry at the user device. For example, the application server 110 may receive an order for multimedia content (e.g., a full-length movie) at 12 P.M. (noon), which may indicate that a customer is ordering the multimedia content during his or her lunch break. The application server 110 may also recognize one or more of the customer's buying patterns and habits, as well as other relevant information (e.g., location of order, customer equipment, network capacity, etc.), to determine a time or a range of times to deliver the movie efficiently/expediently without overburdening vendor side network resources. Processing logic, coupled to information stored in databases, of at least the mobile recognition server 108, the application server 110, and the video-on-demand server 112 may determine this information.

To help distribute the multimedia content, multicast and/or unicast streaming may be utilized. For example, the video-on-demand server 112 may coordinate with the application server 110 to deliver ordered multimedia content to customers in a more efficient and expedient manner via multicast or unicast streaming. For instance, in the event two or more customers order the same multimedia content for delivery within the service area of a particular video-on-demand server 112 within similar delivery times (as determined by the application server 110 or as specified by one or more customers), multicast streaming may be utilized to distribute the multimedia content in one delivery action. As a result, bandwidth may be conserved and network utility maximized. As discussed above, the application server 110 may wait for and receive additional orders before deciding to deliver via multicast streaming. In another embodiment, the video-on-demand server 112 may coordinate with a customer's recording system (e.g., PVRs or DVRs) connected to a customer's set top box to help the application server 110 in delivering the multimedia content. In this example, in the event two or more customers are to be delivered the same multimedia content but at different times or different time periods (as determined by the application server 110 or as specified by one or more customers), multicast streaming may still be used. However, rather than making the multimedia content available for immediate viewing, the video-on-demand server 112 may coordinate with a customer's recording system to store the ordered multimedia content for future viewing/hearing. Coordination may be based on a variety of factors, such as customer preference, equipment detection by the video-on-demand server 112, purchased feature, or other similar factor. In this way, distribution of the multimedia content may still be achieved in one delivery action.

Alternatively, in the event that multicast streaming may not optimize network utility, the video-on-demand server 112 may employ unicast streaming to help the application server 110 deliver multimedia content to a customer.

The ordered multimedia content may be received at one or more output devices 114a, 114b. The one or more output devices 114a, 114b may receive the multimedia content via wired or wireless connection. In one embodiment, wired broadband connection may include long-range optical data communications, local area network based protocols, wide area networks, and/or other similar applications. In another embodiment, wireless broadband connection may include long-range wireless radio, local area wireless network such as 802.11 based protocols, wireless wide area network such as WiMax, infrared, Bluetooth™, and/or other similar applications. In one embodiment, the network may include the Internet or World Wide Web. Other networks may also be utilized for connecting each of the various devices, systems and/or servers. Furthermore, data and/or multimedia content may be transmitted via cable, FiOS, satellite, or other forms of signal transmission.

In addition to the benefits described above, embodiments of the system and method for ordering and distributing multimedia content not only provide an effective and improved technique for offering and selling products, but also may allow multimedia providers (e.g., TV network providers) the ability to service a larger subscriber pool without sacrificing quality of service. Moreover, advantages in business and marketing may also be apparent. When customers/subscribers become increasingly satisfied with a network provider, for example, customer loyalty and customer referrals may expand clientele. Moreover, providing such a purchase option may maximize advertisement and marketing opportunities with third party vendors, etc., which may not otherwise be provided by conventional multimedia purchasing techniques.

While the features and functionalities of the ordering and delivering multimedia content, such as TV programs, are primarily discussed with respect to the embodiments above, it should be appreciated that the features and functionalities of one embodiment may be similarly applied to other embodiments. Furthermore, while the multimedia content is described primarily in reference to TV programs/shows that are currently being aired, will be aired in the future, or previously aired, it should be appreciated by one skilled in the art that the functions and features of the embodiments of the system and method may apply similarly to a host of other multimedia and non-multimedia content as well, where applicable. For example, non-multimedia content that may be ordered may also include physical products/items (e.g., food, groceries, newspapers, magazines, etc.) and/or services (e.g., taxi, delivery service, etc.).

While the embodiments described above may be directed to a user device and at least one vender-side server (e.g., the mobile recognition server 108, the application server, 110, and the video-on-demand server 112) to process the ordering and distribution features discussed above, it should be appreciated to one of ordinary skill in the art that other components, such as an output display device, a set top media box, a recording system, etc., may include processing capabilities to perform the features described above as well. Additionally, it should be appreciated that one or more of these devices and/or components may be combined (e.g., a TV and a network card) to perform the ordering and distributing features described above.

Furthermore, although the embodiments described above are directed toward television multimedia content, it may be readily appreciated that one or ordinary skill in the art may apply the features and functionalities discussed above to any video, audio, or web-based component, such as computers, communications devices, PVRs or DVRs, multimedia websites/servers, DVDs players, VCRs, CD players, MP3s players, etc.

In the preceding specification, various embodiments have been described with reference to the accompanying drawings. It will, however, be evident that various modifications and changes may be made thereto, and additional embodiments may be implemented, without departing from the broader scope of the disclosure as set forth in the claims that follow. The specification and drawings are accordingly to be regarded in an illustrative rather than restrictive sense.

The invention claimed is:

1. A method, comprising:
   receiving data acquired by one or more user devices, wherein the data is an image associated with an order for multimedia content, wherein the order for the multimedia content and the multimedia content are identified using a decoder that decodes the data at a recognition server;
   processing and tracking the order by at least one application server, wherein the processing by the at least one application server comprises:
      optimizing distribution of the multimedia content at a predetermined time, wherein the predetermined time is determined based on a time when the data is acquired, a location where the data is acquired, a user-selected time when the order is desired to be fulfilled, network capacity, network cost, and one or more capabilities associated with the one or more user devices,
      determining whether the order is associated with the identified multimedia content,
      based on the determination, waiting for one or more additional orders for the identified multimedia content to be placed, and
      further determining, by a location detection device, a delivery area for each of the one or more user devices associated with the one order and the one or more additional orders; and
   transmitting the order to at least one distribution server, wherein the at least one distribution server multicasts the multimedia content to the one or more user devices associated with the order and the one or more additional orders based on a determined same delivery area for each of the one or more user devices at the predetermined time.

2. The method of claim 1, wherein the image comprises at least one of a barcode, watermark, and postal code.

3. The method of claim 1, wherein the one or more user devices comprises at least one of a mobile phone, an imaging device, a personal digital assistant (PDA), a smart phone, a telephone, a gaming device, a remote control, and a computer.

4. The method of claim 1, wherein the multimedia content comprises at least one of a movie, a movie trailer, a television episode, a television series, a commercial or advertisement, a music video, a music file, a digital image, a video game, a website, a hyperlink, and an email.

5. The method of claim 1, wherein the one or more user devices includes at least one of a television, a set top box, a recording system, a computer, a gaming console, a digital picture frame, or a mobile multimedia device.

6. A non-transitory computer readable medium comprising code which when executed causes a computer to perform the method of claim 1.

7. A system, comprising:
   a receiver configured to receive data acquired by one or more user devices, wherein the data is an image associated with an order for multimedia content, wherein the order for the multimedia content and the multimedia content are identified using a decoder that decodes the data at a recognition server;
   a processor of at least one application server configured to process and track the order, wherein the processor is configured to: optimize distribution of the multimedia content at a predetermined time, wherein the predetermined time is determined based on a time when the data is acquired, a location where the data is acquired, a user-selected time when the order is desired to be fulfilled, network capacity, network cost, and one or more capabilities associated with the one or more user devices, determine whether the order is associated with the identified multimedia content, based on the determination, wait for one or more additional orders for the identified multimedia content to be placed, and further determine, by a location detection device, a delivery area for each of the one or more user devices associated with the order and the one or more additional orders; and
   a transmitter configured to transmit the order to at least one distribution server, wherein the at least one distribution server multicasts the multimedia content to the one or more user devices associated with the order and the one or more additional orders based on a determined same delivery area for each of the one or more user devices at the predetermined time.

8. A method, comprising:
receiving data from at least one application server, wherein the data is an image associated with an order for multimedia content and the data is acquired for locating and distributing the multimedia content, wherein the order for the multimedia content and the multimedia content are identified using a decoder that decodes the data at a recognition server;
determining whether the order is associated with the identified multimedia content;
based on the determination, waiting for one or more additional orders for the identified multimedia content to be placed, and further determining, by a location detection device, the delivery area for each of the one or more user devices associated with the order and the one or more additional orders; and
multicasting, from at least one distribution server, the multimedia content to the one or more user devices associated with the order and the one or more additional orders based on a determined same delivery area for each of the one or more user devices at a predetermined time, wherein the predetermined time is determined based on a time when the data is acquired, a location where the data is acquired, a user-selected time when the order is desired to be fulfilled, network capacity, network cost, and one or more capabilities associated with the one or more user devices.

9. The method of claim 8, wherein the image comprises at least one of a barcode, watermark, and postal code.

10. The method of claim 8, wherein the one or more user devices comprises at least one of a mobile phone, an imaging device, a personal digital assistant (PDA), a smart phone, a telephone, a gaming device, a remote control, and a computer.

11. The method of claim 8, wherein the multimedia content comprises at least one of a movie, a movie trailer, a television episode, a television series, a commercial or advertisement, a music video, a music file, a digital image, a video game, a website, a hyperlink, and an email.

12. The method of claim 8, wherein the one or more user devices includes at least one of a television, a set top box, a recording system, a computer, a gaming console, a digital picture frame, or a mobile multimedia device.

13. A non-transitory computer readable medium comprising code which when executed causes a computer to perform the method of claim 8.

14. A system, comprising:
a receiver configured to receive data, wherein the data is an image associated with an order for multimedia content and the data is acquired for locating and distributing the multimedia content, wherein the order for the multimedia content and the multimedia content are identified using a decoder that decodes the data at a recognition server;
a processor configured to: process the data, determine whether the order is associated with the identified multimedia content, based on the determination, wait for one or more additional orders associated with the identified multimedia content to be placed, and further determine, by a location detection device, a delivery area for each of one or more user devices associated with the order and the one or more additional orders; and
a transmitter, of at least one distribution server, configured to multicast the multimedia content to the one or more user devices associated with the order and the one or more additional orders based on a determined same delivery area for each of the one or more user devices at a predetermined time, wherein the predetermined time is determined based on a time when the data is acquired, a location where the data is acquired, a user-selected time when the order is desired to be fulfilled, network capacity, network cost, and one or more capabilities associated with the one or more user devices.

15. The method of claim 1, wherein the predetermined time is also determined based on the location of the one or more user devices.

* * * * *